(12) United States Patent
Dale et al.

(10) Patent No.: US 11,586,895 B1
(45) Date of Patent: Feb. 21, 2023

(54) RECURSIVE NEURAL NETWORK USING RANDOM ACCESS MEMORY

(71) Applicant: Green Mountain Semiconductor, Inc., Burlington, VT (US)

(72) Inventors: Bret Dale, Jericho, VT (US); David T Kinney, Burlington, VT (US)

(73) Assignee: Green Mountain Semiconductor, Inc., Burlington, VT (US)

( * ) Notice: Subject to any disclaimer, the term of this patent is extended or adjusted under 35 U.S.C. 154(b) by 235 days.

(21) Appl. No.: 16/902,350

(22) Filed: Jun. 16, 2020

Related U.S. Application Data

(60) Provisional application No. 62/862,248, filed on Jun. 17, 2019.

(51) Int. Cl.
G06N 3/063 (2006.01)
G06F 12/0875 (2016.01)
G06N 3/08 (2023.01)
G06N 3/04 (2023.01)

(52) U.S. Cl.
CPC ......... G06N 3/063 (2013.01); G06F 12/0875 (2013.01); G06N 3/0445 (2013.01); G06N 3/08 (2013.01); *G06F 2212/1041* (2013.01)

(58) Field of Classification Search
None
See application file for complete search history.

(56) References Cited

U.S. PATENT DOCUMENTS

| | | | |
|---|---|---|---|
| 8,976,893 B2 | 3/2015 | Bai | |
| 9,451,899 B2 | 9/2016 | Ritchey et al. | |
| 9,679,241 B2 | 6/2017 | Nugent et al. | |
| 2009/0086071 A1 | 4/2009 | Kagawa et al. | |
| 2014/0133251 A1 | 5/2014 | Takahashi et al. | |
| 2015/0134582 A1* | 5/2015 | Levi | G06N 3/04 706/25 |
| 2015/0324692 A1 | 11/2015 | Ritchey et al. | |
| 2017/0161605 A1 | 6/2017 | Kumar et al. | |
| 2017/0213134 A1 | 7/2017 | Beyeler et al. | |
| 2017/0270410 A1 | 9/2017 | Denham | |
| 2017/0329575 A1 | 11/2017 | Gu et al. | |
| 2017/0372197 A1 | 12/2017 | Baughman et al. | |
| 2018/0046908 A1 | 2/2018 | Cox et al. | |
| 2018/0053550 A1 | 2/2018 | Rakshit et al. | |

(Continued)

*Primary Examiner* — Charles J Choi
(74) *Attorney, Agent, or Firm* — Adams Intellex, PLC

(57) ABSTRACT

Techniques for manipulation of a recursive neural network using random access memory are disclosed. Neural network descriptor information and weight matrices are stored in a semiconductor random access memory device which includes neural network processing logic. The network descriptor information and weight matrices comprise a trained neural network functionality. An input matrix is obtained for processing on the memory device. The trained neural network functionality is executed on the input matrix, which includes processing data for a first layer from the neural network descriptor information to set up the processing logic; manipulating the input matrix using the processing logic and at least one of the weight matrices; caching results of the manipulating in a storage location of the memory device; and processing recursively the results that were cached through the processing logic. Additional data for additional layers is processed until the neural network functionality is complete.

26 Claims, 13 Drawing Sheets

(56) References Cited

U.S. PATENT DOCUMENTS

| | | |
|---|---|---|
| 2018/0082176 A1 | 3/2018 | Wu et al. |
| 2018/0095930 A1 | 4/2018 | Lu et al. |
| 2018/0307982 A1* | 10/2018 | Faivishevsky ......... G06N 20/10 |
| 2019/0147337 A1* | 5/2019 | Yang .................... G06N 3/0454 706/25 |
| 2019/0243755 A1* | 8/2019 | Luo .......................... G06N 3/08 |
| 2019/0392300 A1* | 12/2019 | Weber ...................... G06N 3/04 |
| 2020/0160150 A1* | 5/2020 | Hashemi ............. G06F 12/0284 |
| 2020/0394523 A1* | 12/2020 | Liu ........................ G06N 20/00 |
| 2021/0150352 A1* | 5/2021 | Kim ...................... G06F 15/80 |

* cited by examiner

| HIDDEN LAYER | | |
|---|---|---|
| NODE 3 DEFINITION | | |
| DATA TYPE | CONNECTION | BIAS OR WEIGHT VALUE |
| BIAS | -- | BIAS 3 |
| INPUT CONNECTION | NODE 0 | W1[0,3] |
| INPUT CONNECTION | NODE 1 | W1[1,3] |
| INPUT CONNECTION | NODE 2 | W1[2,3] |
| NODE 4 DEFINITION | | |
| DATA TYPE | CONNECTION | BIAS OR WEIGHT VALUE |
| BIAS | -- | BIAS 4 |
| INPUT CONNECTION | NODE 0 | W1[0,4] |
| INPUT CONNECTION | NODE 1 | W1[1,4] |
| INPUT CONNECTION | NODE 2 | W1[2,4] |
| NODE 5 DEFINITION | | |
| DATA TYPE | CONNECTION | BIAS OR WEIGHT VALUE |
| BIAS | -- | BIAS 5 |
| INPUT CONNECTION | NODE 0 | W1[0,5] |
| INPUT CONNECTION | NODE 1 | W1[1,5] |
| INPUT CONNECTION | NODE 2 | W1[1,5] |
| NODE 6 DEFINITION | | |
| DATA TYPE | CONNECTION | BIAS OR WEIGHT VALUE |
| BIAS | -- | BIAS 6 |
| INPUT CONNECTION | NODE 0 | W1[0,6] |
| INPUT CONNECTION | NODE 1 | W1[1,6] |
| INPUT CONNECTION | NODE 2 | W1[2,6] |

FIG. 7B

| HIDDEN LAYER | | |
|---|---|---|
| NODE 7 DEFINITION | | |
| DATA TYPE | CONNECTION | BIAS OR WEIGHT VALUE |
| BIAS | -- | BIAS 7 |
| INPUT CONNECTION | NODE 3 | W2[3,7] |
| INPUT CONNECTION | NODE 4 | W2[4,7] |
| INPUT CONNECTION | NODE 5 | W2[5,7] |
| INPUT CONNECTION | NODE 6 | W2[6,7] |
| NODE 8 DEFINITION | | |
| DATA TYPE | CONNECTION | BIAS OR WEIGHT VALUE |
| BIAS | -- | BIAS 8 |
| INPUT CONNECTION | NODE 3 | W2[3,8] |
| INPUT CONNECTION | NODE 4 | W2[4,8] |
| INPUT CONNECTION | NODE 5 | W2[5,8] |
| INPUT CONNECTION | NODE 6 | W2[6,8] |
| NODE 9 DEFINITION | | |
| DATA TYPE | CONNECTION | BIAS OR WEIGHT |
| BIAS | -- | BIAS 9 |
| INPUT CONNECTION | NODE 3 | W2[3,9] |
| INPUT CONNECTION | NODE 4 | W2[4,9] |
| INPUT CONNECTION | NODE 5 | W2[5,9] |
| INPUT CONNECTION | NODE 6 | W2[6,9] |
| NODE 10 DEFINITION | | |
| DATA TYPE | CONNECTION | BIAS OR WEIGHT VALUE |
| BIAS | -- | BIAS 10 |
| INPUT CONNECTION | NODE 3 | W2[3,10] |
| INPUT CONNECTION | NODE 4 | W2[4,10] |
| INPUT CONNECTION | NODE 5 | W2[5,10] |
| INPUT CONNECTION | NODE 6 | W2[6,10] |

*FIG. 7C*

RECURSIVE NEURAL NETWORK USING RANDOM ACCESS MEMORY

RELATED APPLICATIONS

This application claims the benefit of U.S. provisional patent applications "In-Memory Inference of a Pre-Programmed Artificial Neural Network" Ser. No. 62/862,248, filed Jun. 17, 2019.

The foregoing application is hereby incorporated by reference in its entirety.

FIELD OF ART

This application relates generally to neural network manipulation and more particularly to recursive neural network using random access memory.

BACKGROUND

Artificial Intelligence (AI) impacts our world in many ways. AI assistants like Siri interact with humans. Robotic vacuums identify obstacles and remember the most efficient paths for cleaning. The automotive industry uses AI-driven predictive capabilities and safety features. AI systems help doctors analyze MRIs and tissue samples to make more accurate diagnoses and to propose treatments. The financial sector uses AI to scan market data and propose stocks for portfolios. Banks use it to detect fraud. Social media and e-commerce companies use AI to personalize experiences for users. Marketers use AI-powered tools to develop customer profiles and create powerful content.

AI is a branch of computer science that focuses on building smart machines that perform tasks which require human intelligence. The machines learn from experience and adjust to new inputs. AI computer systems are powered by machine learning. Some use deep learning and Artificial Neural Networks (ANN). An ANN is a system of hardware and software patterned after the human brain. It involves a large number of processors operating in parallel and arranged in layers. The first layer receives raw data, like a human optical nerve. Each subsequent layer receives output data from the previous layer at network nodes. The layers and nodes are highly interconnected using links like synapses. Each node has an area of knowledge including its experience, rules it was originally programmed with, and any rules it developed for itself. These processing nodes receive, create, store, and transfer data, like human neurons transfer signals, until the last layer produces a system output. ANNs are adaptive because they modify themselves as they learn from initial training and then additional runs provide more information. Whereas a computer is given step by step procedure to perform a task, an ANN is taught to do the task.

During the training phase, an ANN receives training data into the first layer of the network. Individual neurons assign a weight to the input based on the task being performed. Each layer, each node, weights inputs until the total of those weightings produces a final output. Then the training algorithm replies "right" or "wrong." When it's wrong, the ANN adjusts its weights and goes through the process again. The ANN reiteratively continues perfecting its weights until it receives the "right" answer almost every time. A properly weighted network is a massive database. After the ANN has been trained, it's applied to a specific implementation for inference. During this process, the ANN is modified to more quickly apply its learning to data it's never seen.

SUMMARY

ANNs require significant memory. The limited bandwidth of DRAM plus its bottleneck interface with processors create a problem for AI systems. Some AI systems have used a near-memory solution to minimize latency and power consumption. Other AI systems have used in-memory solutions to reduce the write and read communication between the memory and the processor. The technology disclosed herein builds on the in-memory data processing idea, where simple binary addition and multiplication needed to represent single Nodes (or Neurons) of an ANN are in the memory chip. With this method, an AI system can issue one command from the processor to the memory die and all Nodes of a given ANN can be represented and all calculations can be done in the memory die at once, before returning the output of the given ANN back to the processor as a single result. So rather than minimize the communication between the memory and the processor, this method would eliminate all communication between the memory and the processor, with the exception of the writing of input data into the ANN and the reading of the inference result output of the ANN. In this way, die-to-die communication could be reduced to a bare minimum, and the issues of memory chip proximity to the processor and the bandwidth of the processor to memory connection and all the power and time lost in that interaction, are eliminated.

Disclosed techniques address a processor-implemented method for neural network manipulation. Neural network descriptor information and weight matrices are stored in a semiconductor random access memory device. The memory device includes neural network processing logic. The network descriptor information and weight matrices comprise a trained neural network functionality. An input matrix is obtained for processing on the memory device. The trained neural network functionality is executed on the input matrix. Data for a first layer from the neural network descriptor information is processed to set up the processing logic for a neural network operation. The input matrix is manipulated using the processing logic that was set up and at least one of the weight matrices stored in the memory device. The manipulated results are cached in a storage location of the memory device. The results that were cached are processed recursively through the processing logic. The processing logic includes one or more multiple-accumulate units (MACs). The MACs are implemented on pitch on one or more sides of the memory device memory array. A single layer of the neural network functionality is accomplished recursively when the functionality requires more MACs than are available. Additional data for one or more additional layers is processed until the neural network functionality is complete. The neural network functionality includes a recursive neural network function. The result of executing the trained neural network is provided at an output of the memory device.

A processor-implemented method for neural network manipulation is disclosed comprising: storing neural network descriptor information and weight matrices in a semiconductor random access memory device, wherein the memory device includes neural network processing logic, and wherein the network descriptor information and weight matrices comprise a trained neural network functionality; obtaining an input matrix for processing on the memory device; executing the trained neural network functionality on the input matrix, wherein the executing comprises: processing data for a first layer from the neural network descriptor information to set up the processing logic for a neural network operation; manipulating the input matrix, using the processing logic that was set up and at least one of the weight matrices stored in the memory device; caching results of the manipulating in a storage location of the memory device; and processing recursively the results that were cached through the processing logic; and processing additional data for one or more additional layers until the neural network functionality is complete. Some embodiments provide the result of the executing at an output of the memory device. In embodiments, the neural network functionality includes a recursive neural network function. In embodiments, the processing logic includes one or more multiply-accumulate units (MACs).

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 7B shows artificial neural network descriptor data for a hidden layer.

FIG. 7C shows further artificial neural network descriptor data for a hidden layer.

DETAILED DESCRIPTION

Techniques disclosed enable recursive neural network using random access memory. Neural networks provide a powerful technique for processing large quantities of data, particularly when the data includes unstructured data. A neural network typically includes layers, where the layers include an input layer, an output layer, and one or more hidden layers. The processing enables predictions to be made about the data, inferences to be drawn, and so on. Large quantities of data present hard computational challenges because that data must be accessed to the neural network, processed by the neural network, written back to storage, and so on. The large data transfer requirements can greatly degrade computational throughput of the neural network. By configuring random access memory that provides neural network processing logic, data accesses including reads and writes can be accomplished between adjacent devices, thus greatly reducing memory access overhead.

Neural network descriptor information describes how a neural network operates on data. The neural network descriptor information is stored in a semiconductor random access memory (RAM) device, where the RAM device includes neural network processing logic. The neural network descriptor information can "code" or "program the neural network processing logic to perform operations of a node within a layer of the neural network. In addition to the descriptor information, matrices of weights are stored in the RAM device. The weights are used by the node to multiply or scale input data as the node processes the data. The network descriptor information and weight matrices comprise a trained neural network functionality. Training of the neural network is critical to the efficacy of the neural network to make predictions or find inferences. Data, such as an input matrix of data to be processed by the trained neural network, is obtained by reading the data, downloading the data, etc. The trained neural network functionality is executed on input matrix. The executing includes processing data for a first layer of the neural network descriptor information to set up a neural network operation. The input matrix and at least one weight matrix are manipulated. Results of the manipulation are cached in the memory device. The caching enables recursive neural network operation since intermediate results are stored locally for later use. The cached results are processed recursively through the processing logic. Additional data is processed for remaining layers of the neural network until the neural network functionality is complete. Results of the executing are provided at an output of the memory device.

Figure 1:
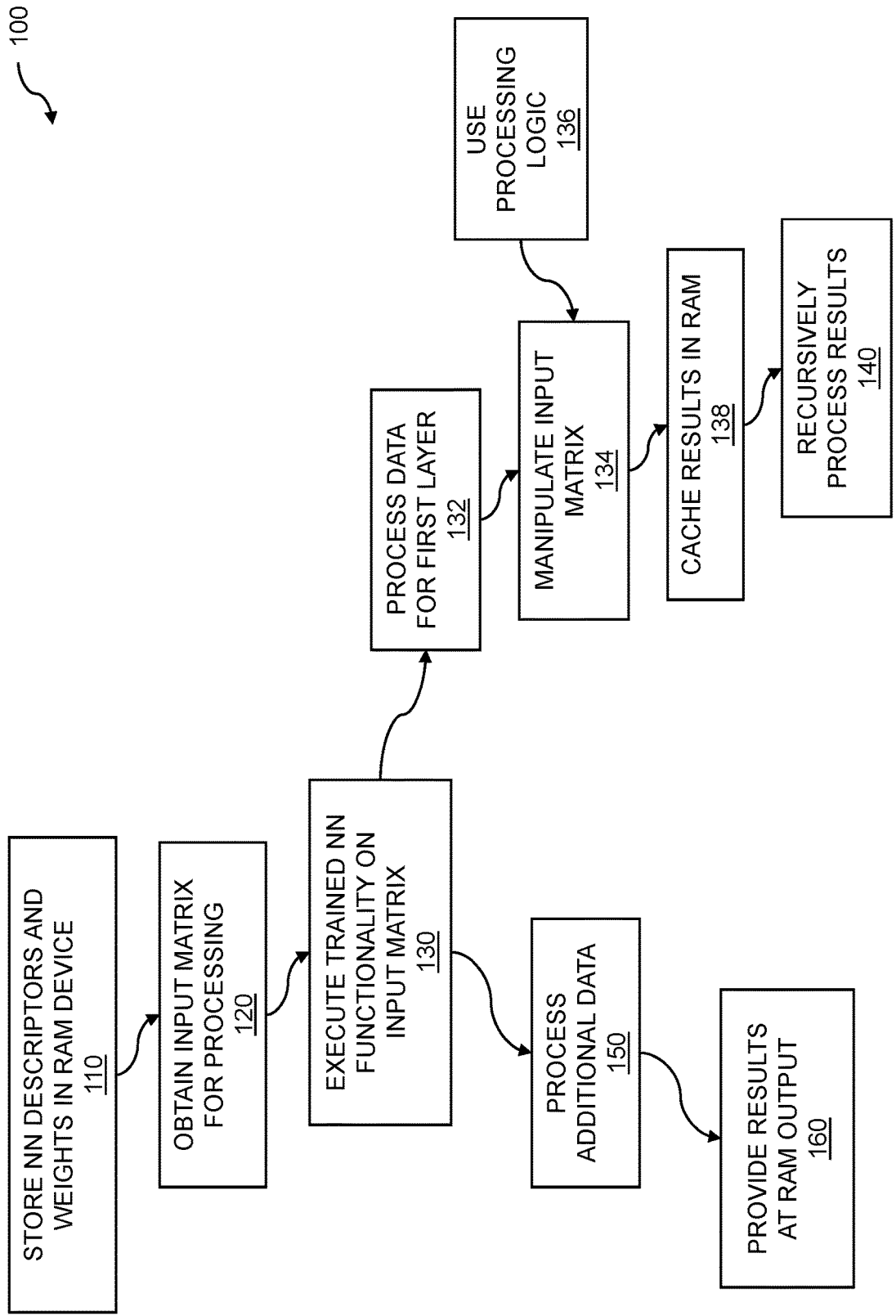
FIG. 1 is a flow diagram for recursive neural network using random access memory.

FIG. 1 is a flow diagram for a recursive neural network using random access memory. A recursive neural network can be used to make predictions about data, draw inferences from the data and so on. A recursive neural network has an advantage over a neural network in that the recursive neural network can be applied to large datasets, even when the requirements for processing the datasets would normally exceed the capabilities of the neural network. Instead, the processing by the recursive neural network handles manageable subsets of the data. The results of managing the subset of the data can be stored locally in a memory device. The locally stored or cached results are then used for further processing, until the processing is complete. The processing includes manipulating data and weights for each node within each layer of the recursive neural network. The recursive neural network is configured by storing neural network descriptor information and weights that describe a trained neural network in a RAM device. The memory device includes neural network processing logic. Input data, where the data can include an input matrix, is obtained for processing on the memory device. The trained neural network functionality executes on the input data. The executing includes setting up the processing logic, manipulating the input matrix with the weight matrix, caching results of the manipulating, and recursively processing additional data until processing for all nodes in all neural network layers is complete.

The flow 100 includes storing neural network descriptor information and weight matrices in a semiconductor random access memory (RAM) device 110. The neural network descriptor information can include a code, a program, an app, text, and so on. The RAM device can be based on a variety of storage technologies. In embodiments, a storage location can include a static random-access memory (SRAM) collocated on the semiconductor random access memory device. An SRAM has the advantage of speed for reading from or writing to a memory at the costs of low storage density and higher power consumption. The storage location can include a portion of the random access memory of the memory device. In other embodiments, the memory device comprises a dynamic random-access memory (DRAM). A DRAM provides higher data density, and in some cases lower power consumption, at the costs of lower data access rates and the need to refresh memory contents more frequently. In further embodiments, the memory device comprises a phase-change random access memory (PCM). PCM offers high density and scalability at the cost of heat sensitivity. In embodiments, the memory device includes neural network processing logic. The neural network processing logic can be configured to perform a variety of operations such as multiplication, addition, and so on.

The operations can be combined. In embodiments, the processing logic can include one or more multiply-accumulate units (MACs). An accumulator differs from an adder, such as a full adder, in that a previous sum can be retained in the accumulator. The accumulator can be used to tally, keep a running sum, and the like. In embodiments, the MACs are implemented on pitch on one or more sides of the memory device memory array. By implementing the MACs on pitch with the memory device, communication with the MACs and the memory device can be simplified which results in faster communication. In embodiments, the network descriptor information and weight matrices can include a trained neural network functionality. Training of the neural network enables the neural network to more quickly converge on a solution, a prediction, an inference, and so on. In embodiments, a single layer of the neural network functionality can be accomplished recursively when the functionality requires more MACs than are available. Recursive neural network functionality can be accomplished using a variety of techniques. In embodiments, the processing logic switches address multiplexers to a temporary register that points to a layer that will be reused in the processing that is recursive. The temporary register can be allocated or located with the RAM device. In embodiments, the memory device can implement the neural network functionality atomically. Atomic functionality can include an operation, task, function, etc., that can be executed independently of other operations. In further embodiments, a single command to the memory device can accomplish the neural network functionality. The single command can be issued by a processor, a computer, and so on. The processor can wait for a response from the neural network functionality. In embodiments, the memory device signals completion after accomplishing the neural network functionality. In other embodiments, the neural network functionality includes a recursive neural network function.

The neural network headers describe how the neural network is configured to process data. In embodiments, the neural network descriptor information can include neural network architecture headers. The architectural headers can describe a type or class of neural network, where the neural network can include a convolutional neural network, a learning network, a recurrent neural network, and so on. In embodiments, two or more bits of the network architecture headers can indicate a neural network layer type. A neural network layer type can include an input layer, an output layer, a hidden layer, a convolutional layer, a hidden layer, an activation layer, etc. In embodiments, the layer type can include a fully connected layer, a sparse layer, or a recursive layer. The layer type can be represented by a code, a number, and the like. In embodiments, the headers can include a different number of bytes, based on the layer type. The neural network descriptor information can provide control information. In embodiments, the neural network descriptor information can provide state diagram control for the neural network functionality. A state diagram, described below, can include one or more states and transitions between states. The transitions can be taken based on data, an event, and so on. States within the state diagram can be skipped, repeated, and so on. In embodiments, the state diagram can be traversed recursively. The flow 100 includes obtaining an input matrix for processing 120 on the memory device. The input matrix can include data of various types. The data types can include unstructured data, audio data, image data, and so on. The input matrix can be uploaded by a user, downloaded over a computer network, read from a file, etc. The input matrix can be loaded into the RAM device for processing by the neural network functionality.

The flow 100 includes executing the trained neural network functionality on the input matrix 130. The executing the trained neural network functionality can include computing multiplications and additions, accumulating products, access the RAM device for reading and writing, and so on. The executing can include performing one or more operations. The flow 100 includes processing data for a first layer 132 from the neural network descriptor information to set up the processing logic for a neural network operation. The setting up the processing logic can include setting up multiplier logic, adder logic, accumulator logic, register logic, and so on. In embodiments, the setting up the processing logic can include setting up multiply-accumulate (MAC) units. In the flow 100, the executing includes manipulating the input matrix 134 and at least one of the weight matrices stored in the memory device. The executing can include multiplying the input matrix by a weight matrix and accumulating products. The processing can be accomplished using the processing logic 136 that was set up. The flow 100 includes caching results of the manipulating in a storage location of the memory device 138. The memory device in which the caching results can be stored can include an SRAM. The flow 100 can include processing recursively the results 140 that were cached through the processing logic. The caching can be used to store intermediate results for a node, results to be shared between or among nodes, and the like.

The flow 100 includes processing additional 150 data for one or more additional layers until the neural network functionality is complete. The processing additional data can include results generated by other nodes within a layer, nodes within a previous layer, and so on. The processing additional nodes and additional layers can include a recursive operation. The flow 100 further includes providing the result of the executing at an output of the memory device 160. The providing the result can include transferring the result from the output of the memory to another location, such as a processor, storage attached to the processor, remote storage, and so on. The providing can include providing the result by reference. In embodiments, the providing the result can include providing a pointer, a memory address, a file name, etc.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. An embedding table can include a matrix of vectors, which represents a dense feature space.

Figure 2:
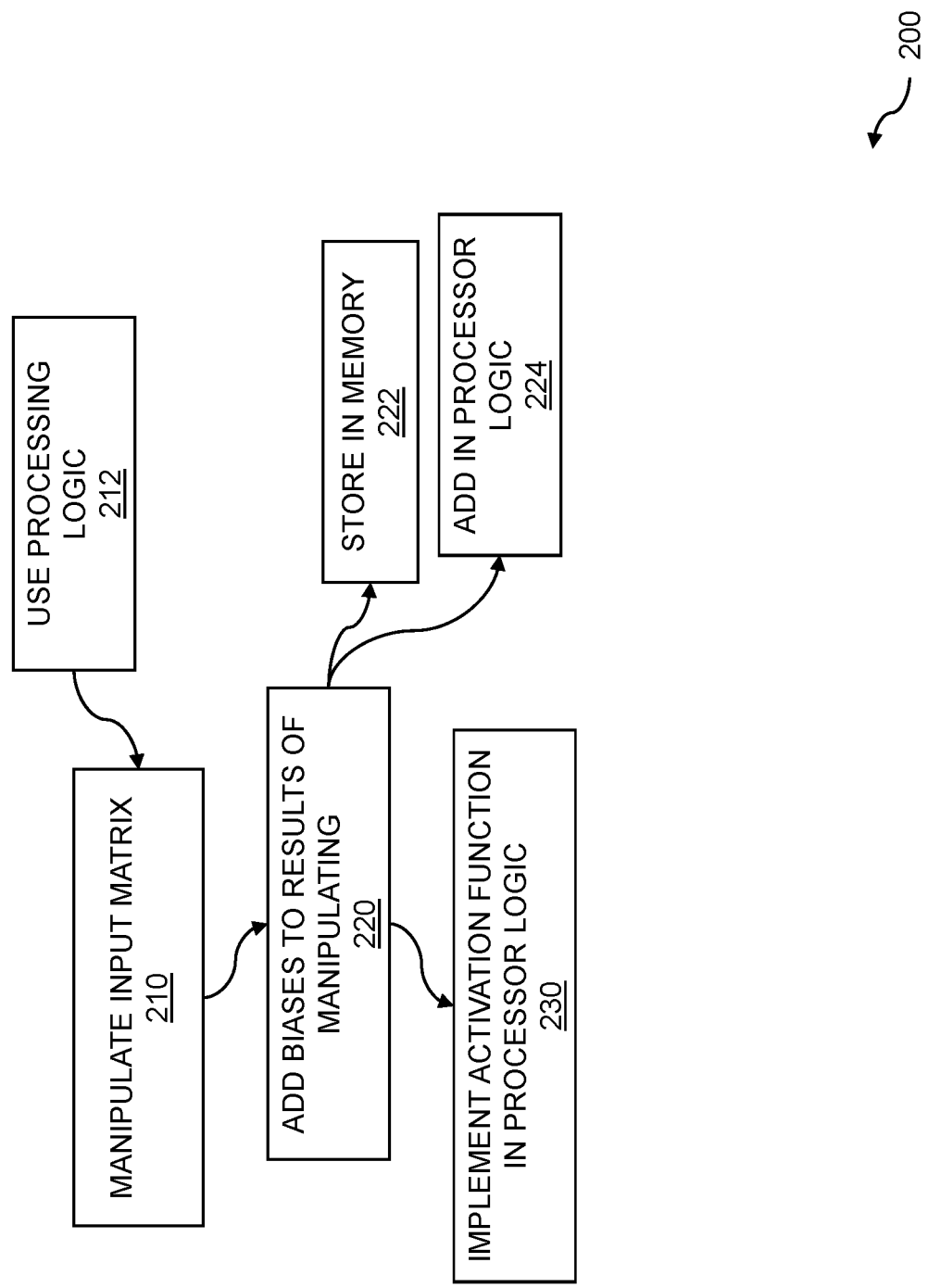
FIG. 2 is a flow diagram for neural network processing.

FIG. 2 is a flow diagram for neural network processing. Functionality of an artificial neural network (ANN) can be used to process data, where the processing of data enables the neural network to make predictions about the data, to draw inferences from the data, and so on. The neural network functionality or processing can be recursive when the functionality of the neural network requires more computational resources than have been or can be configured within a device such as a random access memory device. Such recursive processing takes advantage of storing input data, weight matrices, biases, and other data required by the neural network within the same random access memory device and associated neural network processing logic as that in which the neural network is configured. Neural network processing enables a recursive neural network using random access memory. Neural network descriptor information and weight matrices are stored in a semiconductor random access memory device, where the memory device includes neural network processing logic. The network descriptor information and weight matrices comprise a trained neural network functionality. An input matrix is obtained for processing on the memory device, and the trained neural network functionality is executed on the input matrix. The executing includes processing data for a first layer from the neural network descriptor information to set up the processing logic for a neural network operation, manipulating the input matrix and at least one of the weight matrices, caching results of the manipulating in a storage location of the memory device, and processing recursively the results that were cached through the processing logic. Additional data is processed for one or more additional layers until the neural network functionality is complete. The result of the executing is provided at an output of the memory device.

The flow 200 includes manipulating the input matrix 210. The input matrix can include various types of data, such as unstructured data, audio data, video data, and so on. The manipulating the input matrix includes manipulating at least one of the weight matrices stored in the memory device. The at least one of the weight matrices can include weights associated with a node within a layer of a neural network. In the flow 200, the manipulating the input matrix and the at least one weight matrix uses the processing logic that was set up 212. The setting up of the processing logic is based on the neural network descriptor information. The flow 200 includes adding biases to the results of the manipulating 220. A bias can be used to shift an output of a neuron by a constant amount. A bias can be used to improve fitting of a neural network model to input data. As with the input data, weight matrices, etc., the biases can be stored in the memory device 222 where the biases can be quickly accessed. In embodiments, the biases are added in the processing logic 224. Recall that the processing logic can include one more multiply-accumulate units, so the biases can be added without requiring the configuration of additional adders. In embodiments, the biases can include an adjustable bias size. An adjustable bias size can be used to determine a number of bits, bytes, etc., associated with a bias. The flow 200 includes implementing an activation function in the processing logic 230.

Discussed throughout, an activation function can be used to provide a non-linear mapping between input data and output data. The non-linear mapping can improve convergence by the neural network. In embodiments, the activation function is defined by the neural network descriptor information. Various techniques can be used for the activation. In embodiments, the activation function can include a sigmoid, rectified linear unit (ReLU), hyperbolic tangent (tan h), and so on. Various embodiments of the flow 200 can be included in a computer program product embodied in a non-transitory computer readable medium that includes code executable by one or more processors.

Figure 3:
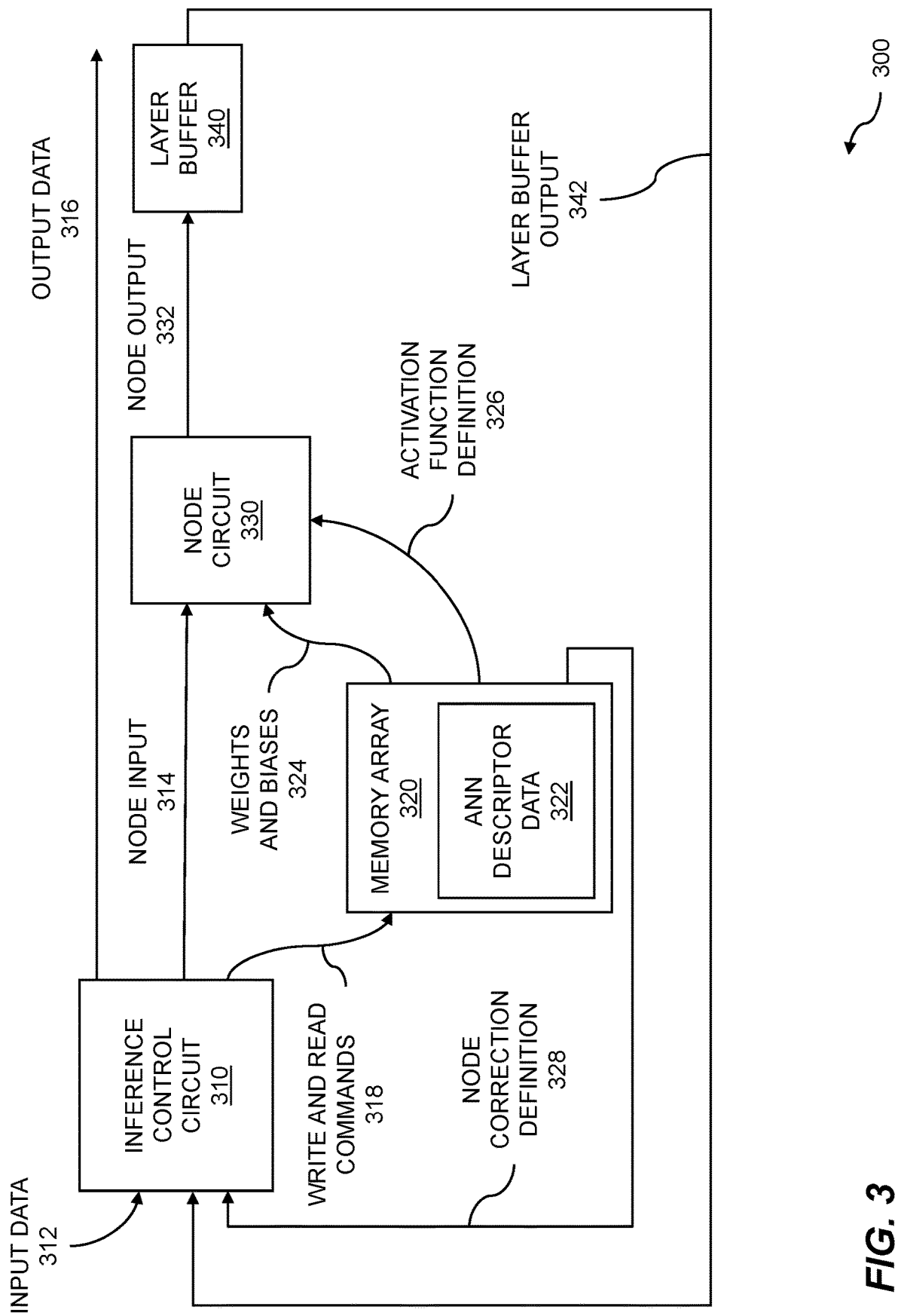
FIG. 3 shows an in-memory artificial neural network (ANN).

FIG. 3 shows an in-memory artificial neural network (ANN). An artificial neural network can be configured within a random access memory device. Configuring the ANN within the memory device can enable rapid reconfiguration of a neural network and can thus support machine learning. Configuring the ANN within the memory device further provides rapid access to input data, intermediate data, cached data, and so on. An in-memory artificial neural network enables a recursive neural network that can be used for processing input data and other data. Neural network descriptor information and weight matrices are stored in a semiconductor random access memory device. The memory device includes neural network processing logic, and the network descriptor information and weight matrices comprise a trained neural network functionality. An input matrix is obtained for processing, and the trained neural network functionality is executed on the input matrix. Additional data for one or more additional layers is processed until the neural network functionality is complete. The result of the executing is provided at an output of the memory device.

An in-memory artificial neural network 300 obtains input data, makes an inference about the data, and provides output data. The in-memory artificial neural network includes an inference control circuit 310. The inference control block (ICC) can include a semiconductor circuit or chip, a module within a chip, a die, etc. The ICC can be configured within processing logic associated with a random access memory device. In embodiments, the ICC obtains input data 312, where the input data can include unstructured data, a vector, a matrix, and so on. Discussed below, the ICC further provides node input data 314 to a node circuit 330, and, after determining an inference, provides output data 316. The output data can be transferred off-die. The ICC further provides write and read commands 318 to a memory array. To configure the ICC, neural network descriptor information, which describes an artificial neural network (ANN), is stored in a memory array 320. The memory array can include a random access memory (RAM) device, where the RAM device can include a static RAM (SRAM), a dynamic RAM (DRAM), phase-change memory (PCM), and the like. The ANN descriptor data 322 can include a trained neural network functionality. In addition to the ANN descriptor information, weights and biases 324 can be stored in the memory array. Described below, the weights and biases can be provided to the node circuit 330. The memory array can provide further information to the node circuit. In embodiments, the memory array can provide an activation function definition 326 to the node circuit. The activation function definition can include a sigmoid, a rectifier linear unit (ReLU), a hyperbolic tangent (tan h), and the like. In embodiments, contents of the memory array can be provided to or fed back to the ICC. The contents of the memory array that can be fed back to the ICC can include node correction definitions 328. The node correction definitions can enable learning by the ICC.

The node circuit 330 implements a node within a layer of the ANN. The node can be implemented by configuring neural network processing logic associated with the memory array. Recall that an ANN can comprise multiple layers, where the layers can include an input layer, one or more hidden layers, an output layer, and so on. The node circuit can multiply node input data by weights, add together products that result from the multiplications, and so on. In embodiments, the processing logic includes one or more multiply-accumulate units (MACs). The MACs multiply pairs of numbers and add the products to a "running total" of products collected in the accumulator. A MAC can comprise a multiplier, an adder, and a register. The number of MACs available may not be sufficient to support the neural network functionality. In embodiments, a single layer of the neural network functionality can be accomplished recursively when the functionality requires more MACs than are available. To accomplish neural network functionality recursively, data, intermediate data, partial results, and so on can be cached. A layer buffer 340 can be used to cache node output 332 results of manipulating by the node circuit 330. The layer buffer can include a storage location within the memory array. The layer buffer output 342 can be fed back to the ICC. The layer buffer output data can be provided by the ICC to the node circuit, can generate additional write and read commands to the memory array, etc. At completion of processing of the layers of the ANN, the output data 316 becomes valid.

In a usage example, an output can be calculated by the ANN and can be provided at an output of the memory device as follows:

1) At chip power-up or initialization, the ANN descriptor information can be be written into the memory array. The ANN descriptor information informs the ICC which commands to execute in what order, and the location to which the associated weights and biases should be written.

2) An external processor can issue an inference command to the memory array. If multiple ANNs are stored on the array, then the command contains an identifier to tell the ICC which ANN to execute. The command can further contain the input data to be fed to the ANN for inference. The input data is stored in registers within the ICC and is accessed by the ICC throughout the calculation process.

3) If more than one ANN is stored on the memory, the ICC accesses an architectural header provided with the inference command and loads the ANN descriptor information associated with the identified ANN.

4) The ICC starts executing the first node to determine the output of the first node. The executing includes processing the input data, weights associated with the first node, a bias, etc. The input to the first node can be provided by the ICC, and the weights and biases can be read from the memory array. Note that the activation function definition only needs to be read into the node circuit once per inference by the ANN or once at power-up. The result of the processing of data by the node is stored in registers within the layer buffer. The data is cached for use in later calculations.

5) This processing continues for the remaining nodes within a given layer such as the input layer. The results of processing by the remaining nodes are also stored in registers within the layer buffer.

6) Now the first node in the hidden layer can be processed. For a fully connected layer, each node output of the previous layer provides an input to each node of the current layer. The ICC description which was previously loaded issues commands required to determine the output of a node of the hidden layer.

7) The processing continues for the remaining nodes within the hidden layer.

8) The processing steps are repeated for processing of nodes within the output layer. The results of the processing by the nodes of the output layer are stored in registers within the layer buffer. The ICC can feed the data stored in the layer buffer for each of the output layer nodes to the output pins of the memory chip and off die. The Inference result for the ANN can be provided to the processor that initiated the inference request.

Figure 4:
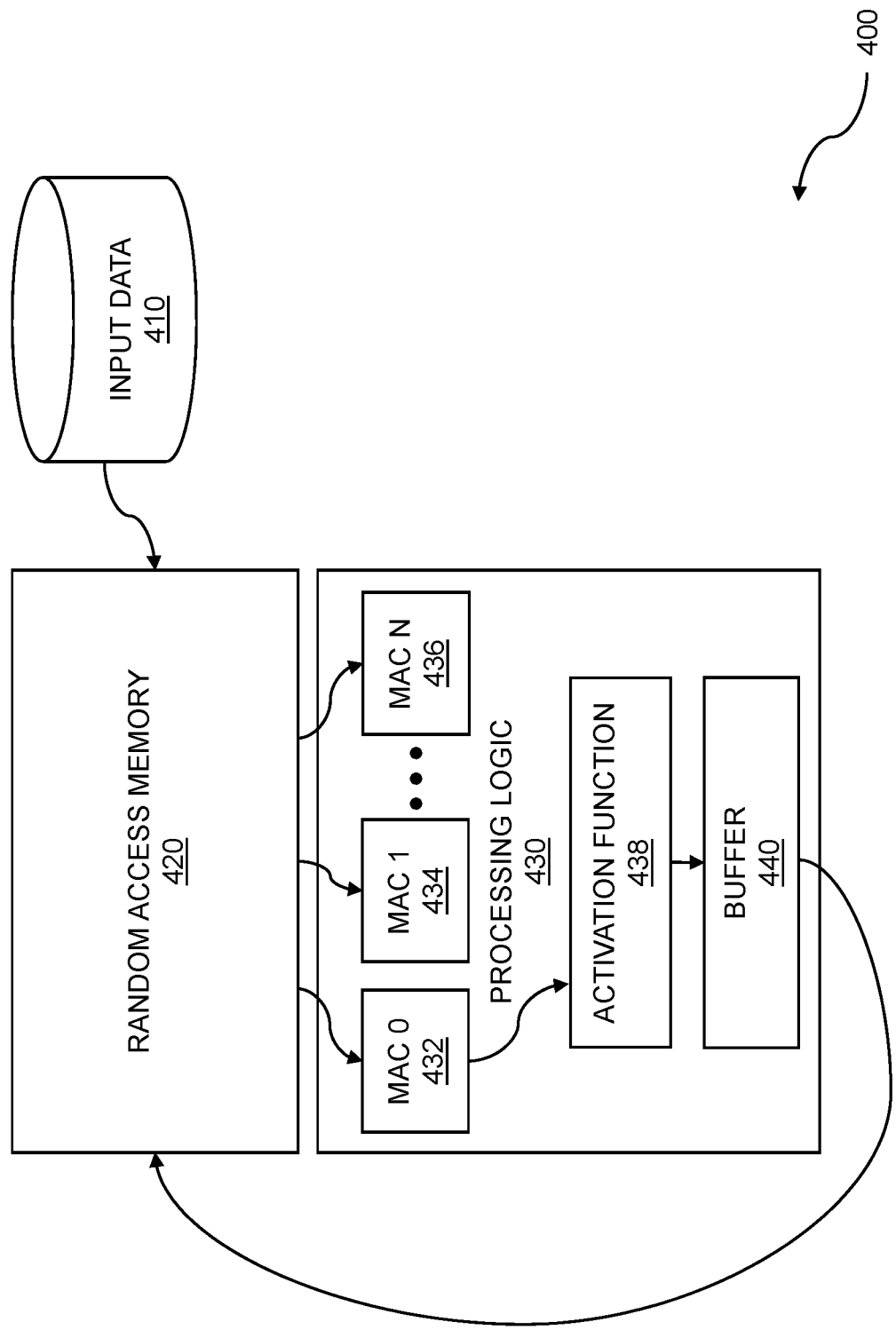
FIG. 4 is a system diagram for random access memory usage.

FIG. 4 is a system diagram for random access memory usage. Discussed throughout, a random access memory device can include neural network processing logic. The neural network processing logic can be loaded with a trained neural network, and the neural network can process data, weights, biases, and so on, stored in the memory device. Using random access memory that includes neural network processing logic enables a recursive neural network. Neural network descriptor information and weight matrices are stored in a semiconductor random access memory device, where the memory device includes neural network processing logic, and where the network descriptor information and weight matrices comprise a trained neural network functionality. An input matrix for processing on the memory device is obtained. The trained neural network functionality is executed on the input matrix, where the executing includes processing data for a first layer from the neural network descriptor information to set up the processing logic for a neural network operation, manipulating the input matrix, using the processing logic that was set up and at least one of the weight matrices, caching results of the manipulating, and processing recursively the results that were cached. Additional data is processed for one or more additional layers until the neural network functionality is complete. The result of the executing is provided at an output of the memory device.

A system diagram 400 for using random access memory (RAM) is shown. Input data 410 can include unstructured data, vectors, matrices, and so on. The input data can include data to be processed, weight matrices used by nodes within a neural network, biases that can be added, and the like. The input data can be stored using a storage location in a random access memory 420 device. The storage location can include a portion of the random access memory of the memory device. The RAM device can be based on a variety of technologies appropriate for storing data. In embodiments, the storage location can include a static random-access memory (SRAM) collocated on the semiconductor random access memory device. An SRAM has the advantage of access speed for reading and writing at the costs of larger size per bit and higher power consumption. In other embodiments, the memory device can include a dynamic random-access memory (DRAM). A DRAM includes more data storage per unit area, lower power consumption, etc. In further embodiments, the memory device can include a phase-change random access memory (PCM). Phase-change memory advantages include non-volatility and storage density.

The RAM includes neural network processing logic 430. The processing logic can be coupled to the RAM device, resident within the RAM device, and so on. The neural network processing login can include one or more multiply-accumulate units (MACs). Three MACs are shown including Mac 0 432, Mac 1 434, and Mac N 436. While three MACs are shown, other numbers of MACs can be included. In embodiments, the MACs can be implemented on pitch on one or more sides of the memory device memory array. On pitch implementation can reduce circuit area, minimize access speed for data access, etc. A multiply-accumulate unit is useful to processing by a neural network because a node within the neural network multiplies data by weighs and computes a sum. The sum can include a "running sum" or "running total". Note that the number of MACs available for neural network functionality may be less than a number of MACs required by the functionality. In embodiments, a single layer of the neural network functionality can be accomplished recursively when the functionality requires more MACs than are available.

The processing logic can include an activation function 438. Embodiments include implementing an activation function in the processing logic. Various techniques can be used to implement the activation function. In embodiments, the activation function can be defined by the neural network descriptor information. An activation function can perform a nonlinear mapping of input data to output data. The activation function can prevent "saturation" of computations by a node of a neural network, where saturation can include calculations "saturating" at a minimum value or a maximum value. The activation function can enable faster convergence by the neural network to make a prediction about the input data, to make an inference about the input data, etc. Various techniques can be used to implement the activation function. In embodiments, the activation function can include a sigmoid, a rectified linear unit (ReLU), a hyperbolic tangent (tan h), and so on. The processing logic can include a buffer 440. The buffer can be used to cache results of manipulating an input matrix by a neural network. Embodiments include caching results of the manipulating in a storage location of the memory device 420.

Figure 5:
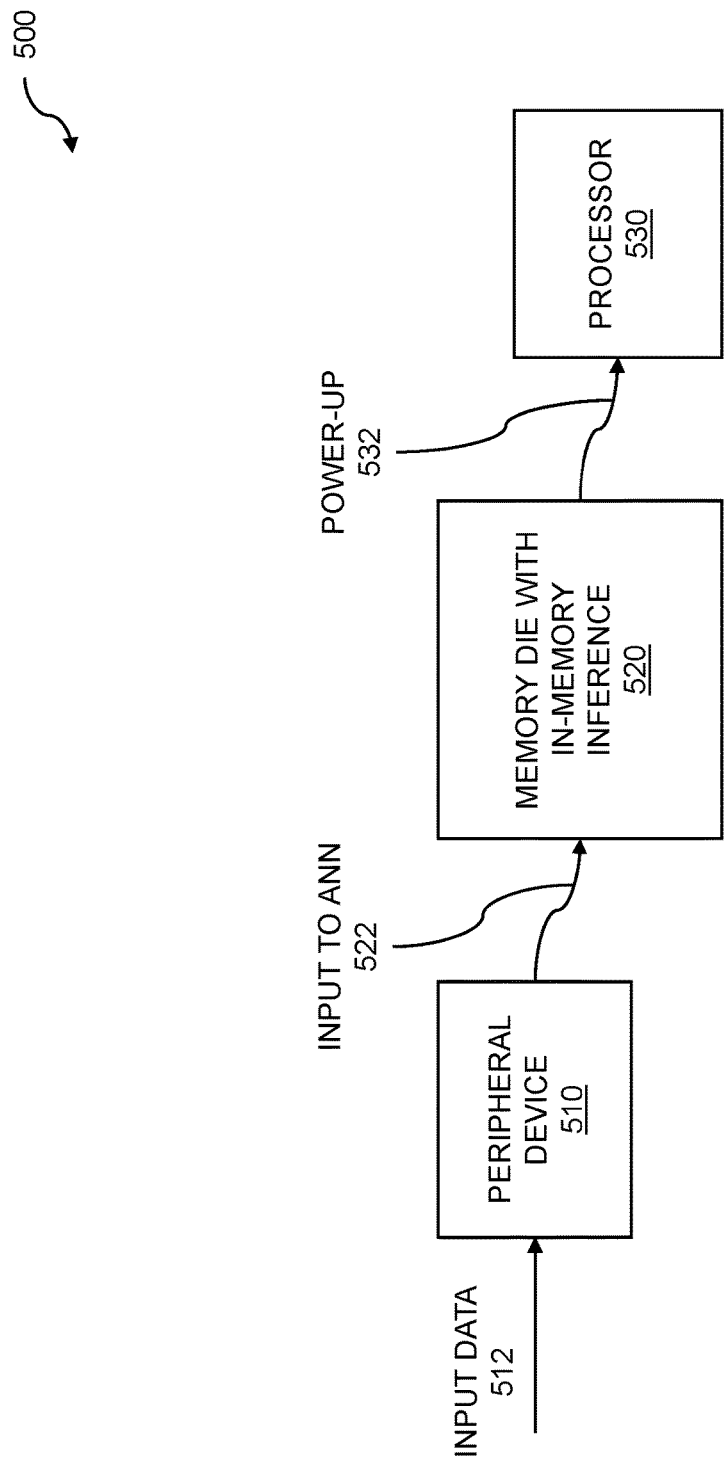
FIG. 5 shows in-memory inference.

FIG. 5 shows in-memory inference. In-memory inference can be used to reduce power consumption, reduce processing and storage requirements, and so on, by monitoring one or more peripherals. If no signal or data is received from the one or more peripherals, then a processor used to process the peripheral signals or data can be put into low power mode. In-memory inference can enable a recursive neural network using random access memory. Neural network descriptor information and weight matrices are stored in a semiconductor random access memory device. The network descriptor information and weight matrices comprise a trained neural network functionality. The memory device includes neural network processing logic. An input matrix for processing on the memory device is obtained, and the trained neural network functionality is executed on the input matrix. Additional data is processed for one or more additional layers until the neural network functionality is complete.

In-memory inference is shown 500. A peripheral device 510 receives input data 512. The input device can include a microphone, a camera, a sensor, and so on. The data that is received by a sensor is dependent on the type of sensor receiving the data. A microphone can capture audio signals such as ambient sound, human generated sounds, and so on. A camera can receive images, where the images can include one or more people, objects, etc. The camera can capture an image or sample of the input data, a stream of data such as a video, and so on. The peripheral device can provide input 522 to a memory die with in-memory inference 520. In embodiments, the input can be provided to the memory using techniques such as direct memory access (DMA). The memory die or semiconductor random access memory device can be used to implement an artificial neural network (ANN). Discussed throughout, the neural network can include a fully connected neural network that can include an input layer, an output layer, and one or more hidden layers, etc. The neural network can be used to determine an inference where the inference can include inferring or predicting that the input to the neural network contains useful information. The useful information can include a voice, a particular sound, an image of a person or animal of interest, and the like. When the inference indicates that the input to the neural network includes information of interest, then a processor 530 can be powered up 532. The processor, once powered up, can be used to capture the input data, analyze the input data, process the input data, and so on.

Figure 6:
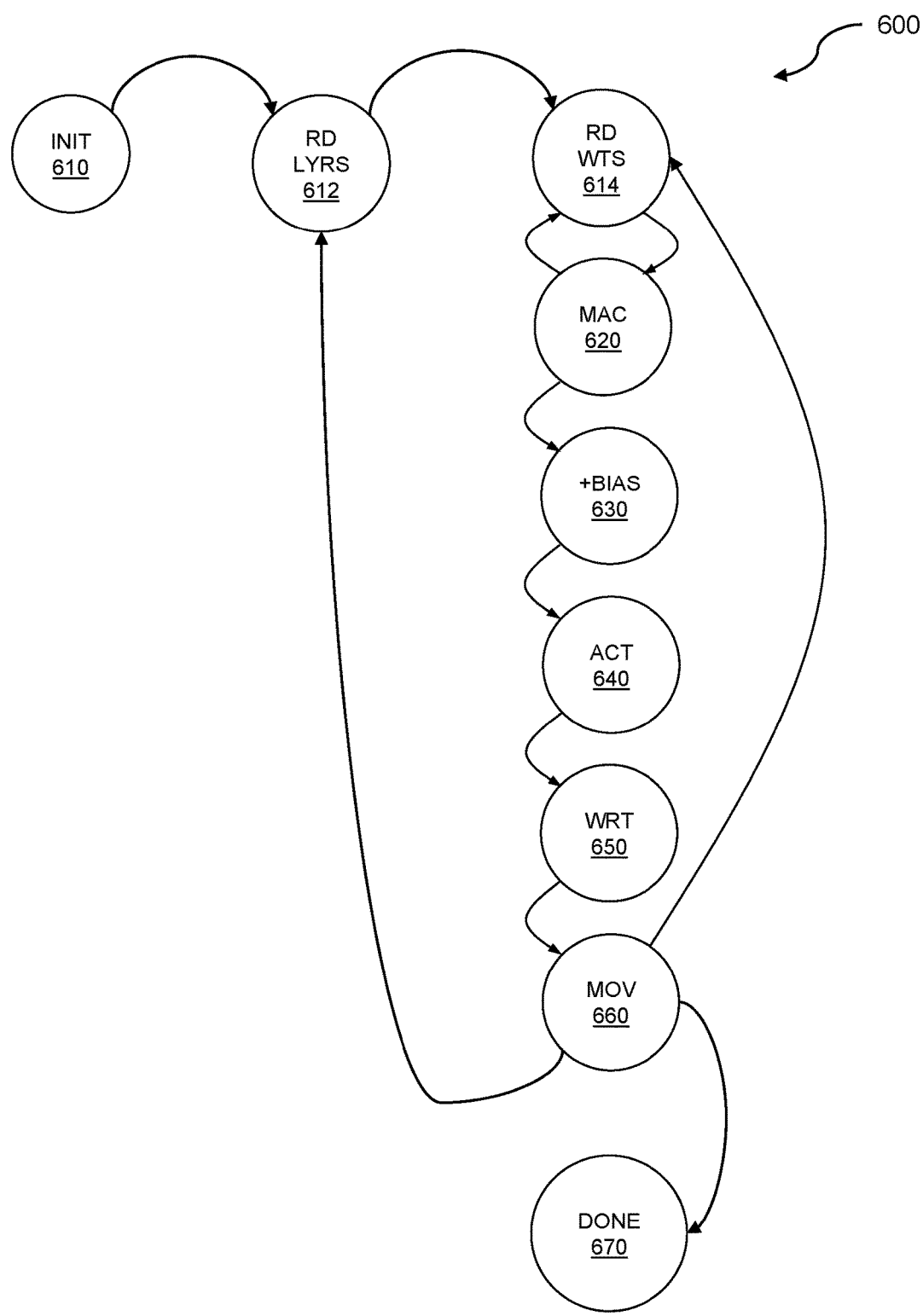
FIG. 6 illustrates a state machine.

FIG. 6 illustrates a state machine. An artificial neural network (ANN) can be used to process data. The data can include data such as large amounts of unstructured data. A state machine can be used to describe the various operations of the state machine, where the operations can include initialization, data transfer, data manipulation, and so on. A state machine enables a recursive neural network using random access memory. Neural network descriptor information and weight matrices are stored in a semiconductor random access memory device, where the memory device includes neural network processing logic, and where the network descriptor information and weight matrices comprise a trained neural network functionality. An input matrix is obtained for processing on the memory device, and the trained neural network functionality is executed on the input matrix. The executing includes processing data for a first layer from the neural network descriptor information to set up the processing logic for a neural network operation; manipulating the input matrix, using the processing logic that was set up and at least one of the weight matrices stored in the memory device; caching results of the manipulating in a storage location of the memory device; and processing recursively the results that were cached through the processing logic. Additional data is processed for one or more additional layers until the neural network functionality is complete. The result of the executing is provided at an output of the memory device.

Various states of a state machine for operating a node of a neural network are shown 600. A state machine includes various states and describes the transitions between states. Transitions between states can occur based on inputs, where the inputs can include data, controls, signals, initializations, etc. Operations can occur in a given state. The operation can include waiting for data, performing an operation on data, obtaining or reading data, writing or storing data, and so on. The state machine can include an initial state 610, where the initial state can include the state from which the state machine can begin operating. The state machine can include a read layers state 612. The read layers state can read neural network descriptor information. The neural network descriptor information can include a description of a number of layers within a neural network, operations performed and data flow within the neural network, and so on. In embodiments, the neural network descriptor information comprises neural network architecture headers. The neural network architectural headers can provide detailed information associated with the neural network. In embodiments, two or more bits of the network architecture headers indicate a neural network layer type. The neural network layer type can include an input layer, a hidden layer, an output layer, etc. In other embodiments, the neural network descriptor information can provide state diagram control for the neural network functionality.

The state machine can include a read weights state 614. The number of weights that can be read can be based on a count. The weights can be read from a storage device such as a random access storage device. The storage device can include neural network processing logic. The state machine can include a multiply-accumulate (MAC) state 620. The MAC state can multiply data by a weight and can add the product of the multiplication to a "running total" of partial products calculated previously. An accumulator differs from an adder in that the accumulator includes storage as well as the adder. Transitions can occur between the read weights and the multiply-accumulate states based on an amount of data to be processed. If data remains to be processed, then the additional weights can be read, a product can be calculated between data and the weights, and the product can be added to the accumulator. When data has been processed, then the state machine can advance to an add bias state 630. Embodiments include adding biases to the results of the manipulating. A bias can be added in order to prevent computations by a node "saturating" to a minimum value or a maximum value. The bias can be uploaded by a user, downloaded over the Internet, and so on. In embodiments, the biases can be stored in the memory device, thus minimizing an amount of time required to obtain the biases. In other embodiments, the biases can include an adjustable bias size. The bias size can be based on one or more bits, one or more bytes, and so on.

The state diagram can include an activation state 640. The activation state can include applying an activation function to data. As for other states defined by the state machine, an activation function can be implemented in the processing logic. An activation function can aid convergence of the neural network controlled by the state machine. Various functions, heuristics, techniques, and so on can be used for the activation function. In embodiments, activation function can include a sigmoid function, a rectified linear unit (ReLU), a hyperbolic tangent (tan h), etc. The state diagram can include a write to layer buffer state 650. A layer buffer, which can include storage allocated within the random access storage device, can store intermediate results, partial products, sums of products, etc. The layer buffer can include a cache, where the cache can include storage within the memory device. The state machine can include a move state 660. When processing for data associated with each node within a given layer has completed, then outputs of the nodes within a given layer can be moved (stored) for processing by a subsequent layer, if one is present within the neural network. If an additional layer is present, then the state machine returns to the read layers state 612. If no additional layers are present, then the state of the state machine progresses to a terminal or done state 670.

Figure 7A:
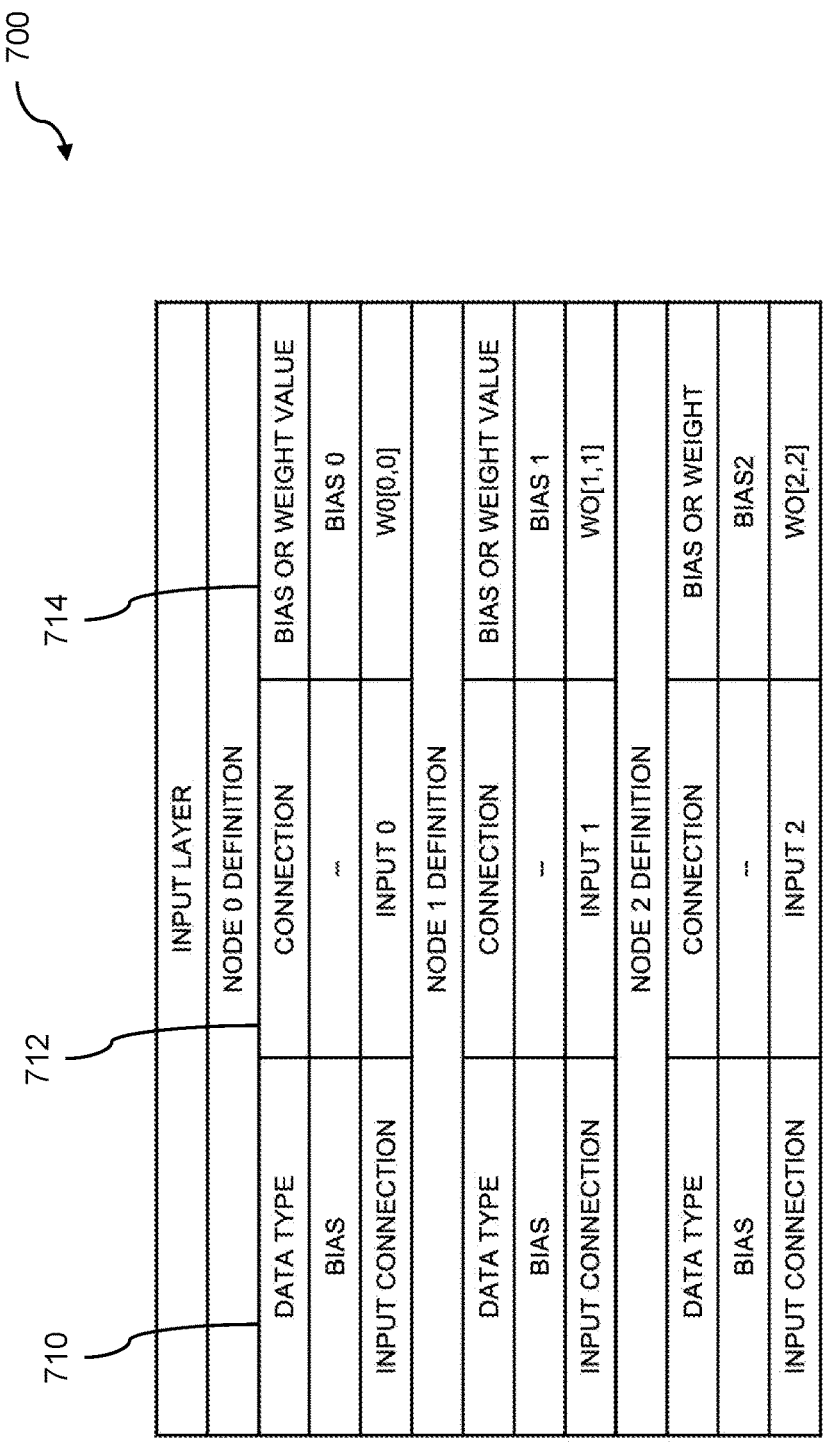
FIG. 7A shows artificial neural network descriptor data for an input layer.

FIG. 7A shows artificial neural network descriptor data for an input layer 700. Artificial neural network (ANN) descriptor data, where the descriptor data can describe a trained neural network, can be stored in a random access memory. Operation of the ANN can include recursive operation. The descriptor data enables a recursive neural network using random access memory. Neural network descriptor information and weight matrices are stored in a semiconductor random access memory device, where the memory device includes neural network processing logic, and where the network descriptor information and weight matrices comprise a trained neural network functionality. An input matrix is obtained for processing on the memory device. The trained neural network functionality is executed on the input matrix, where the executing comprises processing data for a first layer from the neural network descriptor information to set up the processing logic for a neural network operation; manipulating the input matrix, using the processing logic that was set up and at least one of the weight matrices stored in the memory device; caching results of the manipulating in a storage location of the memory device; and processing recursively the results that were cached through the processing logic. Additional data is processed for one or more additional layers until the neural network functionality is complete.

Descriptor data for an input layer 700 is shown. The descriptor data includes descriptions for configuration of neural network processing logic for each node in the layer. The configuration for each node within a layer can include describing an operation to be performed by the node, data to be provided to the node, outputs generated by the node, and so on. In embodiments, a node operation can include a multiply-accumulate operation. The descriptor data can further include weights associated with each node, biases that can be applied to each node, etc. The descriptor data describes a data type 710 and can include a connection description. The data type can include data, bias, weight, etc. The connection description can include an input connection, an output connection, and the like. The descriptor data can further include the name of a connection 712. The connection name can include a name of an input to the node, an output from the node, etc. The connection can be an input to a node or neuron within the input layer, and a bias or weight value. The descriptor data can describe a bias or a weight value 714. The bias or weight value can include a signal name, a data name, and the like. The bias or weight value can include a single value, a value read from a vector or matrix, etc.

FIG. 7B shows artificial neural network descriptor data for a hidden layer. The hidden can include a layer of the neural network between the input layer and the output layer. While one hidden layer is shown, more than one hidden layer can be included within the neural network. The hidden layer can perform a variety of tasks, where the tasks can be based on an application of the neural network such as convolution, image processing, audio processing, deep learning, etc. In embodiments, the tasks performed by the hidden layer can be accomplished using one or more multiply-accumulate units. Descriptor data for a hidden layer is shown 702. As for the input layer, descriptor data includes descriptions for configuring neural network processing logic for each node within the hidden layer. The configuration data describes node operations within the hidden layer, input data, output data, weights, biases, and so on. A node operation can be performed by a multiply-accumulate unit. The descriptor data includes a data type 720 and can include a connection description such as in input connection. The data type can include data, bias, weight, etc. The descriptor data can further include one or more connection 722 names. The connection names can include a name of an input to the node, an output from the node, such as a node in a previous layer with in the neural network, etc. The connection can be an input to a node or neuron within the hidden layer. Note that each node of the input layer is connected to each node in the hidden layer for a fully connected layer. The descriptor data can describe a bias or a weight value 724. The bias or weight value can include a signal name, a data name, and the like.

FIG. 7C shows further artificial neural network descriptor data for a hidden layer. In this example, the hidden layer can include a layer between the hidden layer described above and the outputs from the artificial neural network. This latter hidden or output layer can apply techniques such as techniques based on an activation function. An activation function can provide a nonlinear mapping of data between the input to the neural network and the output of the neural network. The activation function can improve convergence by the neural network. Convergence by the neural network enables predictions about data operated on by the neural network, inferences about the data, and so on. Descriptor data for a hidden or output layer is shown 704. As for the input layer and the hidden layer, descriptor data includes descriptions for configuring neural network processing logic for each node within the hidden or output layer. The configuration data includes node operations such as activation, input data, output data, weights, biases, and so on. A node operation including an activation operation can be performed using an activation function. A variety of techniques can be used for the activation function including using a sigmoid function, a rectified linear unit, a hyperbolic tangent (tan h) function, and the like. The descriptor data includes a data type 730 and can include a connection description such as an input connection. The data type can include data, bias, weight, etc. The descriptor data can further include one or more connection 732 names. The connection names can include a name of an input to the node, an output from the node, such as a node in a previous layer such as a hidden layer, etc. Each node of the hidden layer is connected to each node in the hidden or output layer for a fully connected layer. The descriptor data can describe a bias or a weight value 734. The bias or weight value can include a signal name, a data name, and the like.

Figure 8:
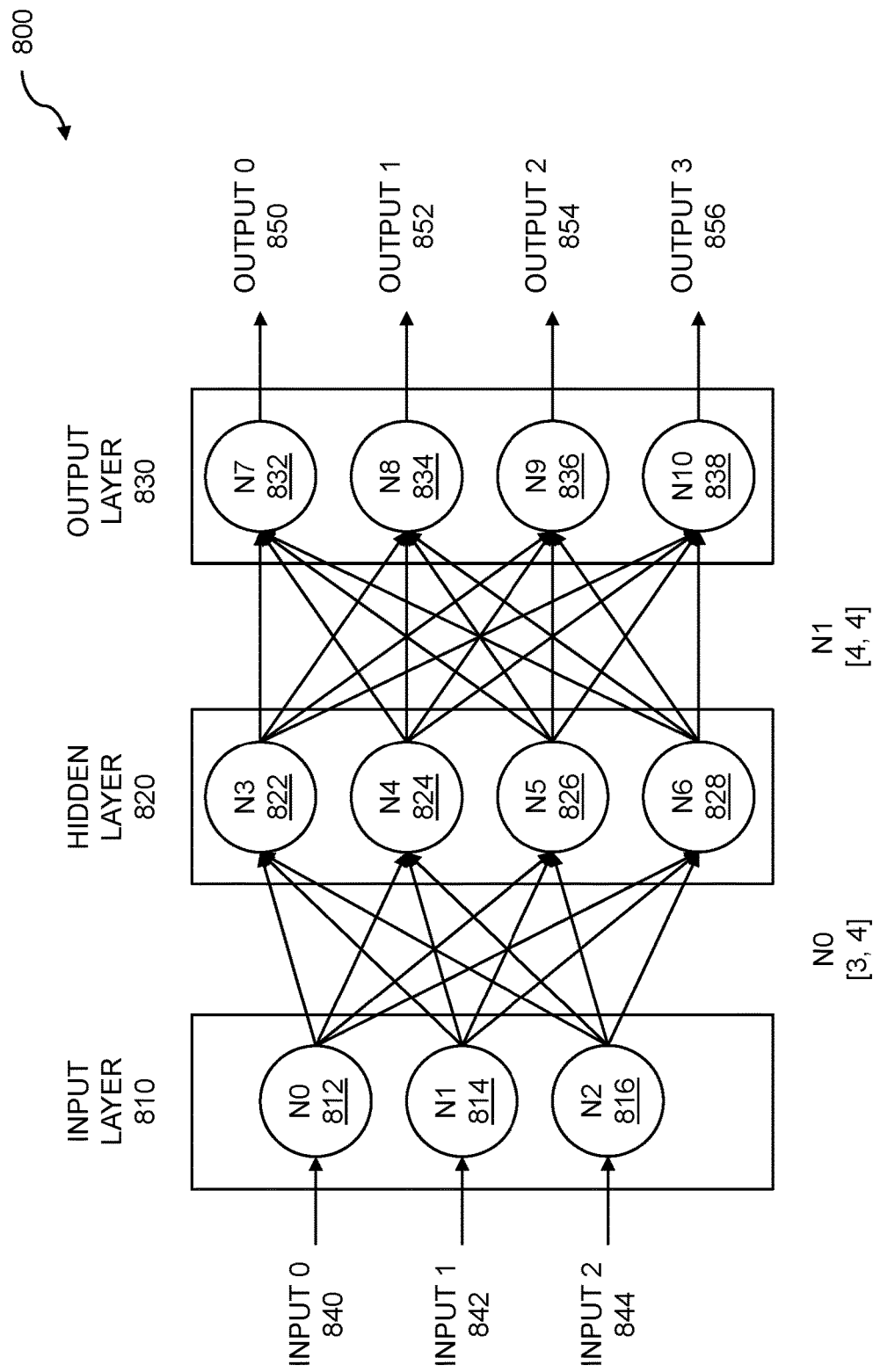
FIG. 8 illustrates an artificial neural network.

FIG. 8 illustrates an artificial neural network. An artificial neural network (ANN), which is generally informed by a model of the operation of a brain such as a human or other animal brain, can be used to process data. The data is processed in order to make predictions or inferences about the data. The artificial neural network can be recursive and can be based on using random access memory. Neural network descriptor information and weight matrices are located in a semiconductor random access memory device. An input matrix for processing on the memory device is obtained, and the trained neural network functionality is executed on the input matrix. Additional data is processed for one or more additional layers until the neural network functionality is complete. The result of the executing is provided at an output of the memory device.

An artificial neural network based on three layers is shown 800. The neural network comprises an input layer 810, a hidden layer 820, and an output layer 830. While three layers are shown, the neural network can include additional layers such as additional hidden layers. The input layer 810 includes one or more nodes such as nodes N0 812, N1 814, and N2 816. While three input nodes are shown, one or more input nodes can be included for receiving input data. The input nodes can receive input data using the inputs. In the example shown, node N0 receives input 0 840, node N1 receives input 1 842, and node N2 receives input 2 844. The nodes can multiply the inputs by weights, add biases, and so on. The nodes of the input layer can be in communication with nodes of a layer such as hidden layer 820. The outputs of the nodes of the input layer can be coupled to one or more nodes of the hidden layer. The output of each node of the input layer is coupled to each node input of the hidden layer. This interconnection configuration can be described as fully connected.

The hidden layer 820 includes four nodes, node N3 822, node N4 824, node N5 826, and node N6 828. The four nodes can receive data from the input layer, multiply the data from the input layer by weights, add biases, and so on. The outputs of each of the nodes within the hidden layer are coupled to each of the inputs of the output layer 830 thus accomplishing a fully connected configuration. The nodes of the output layer can include output nodes N7 832, node N8 834, node N9 836, and node N10 838. As for other nodes within the neural network, each node in the output layer can multiply inputs to the node by associated weights. The products can be summed and a bias can be added to the sum. The outputs of the nodes of the output layer 830 can be provided. Embodiments can include providing the result of the executing the trained neural network functionality on an input matrix at an output of the memory device. For the neural network shown, the outputs can include Output 0 850, Output 1 852, Output 2 854, and Output 3 856. The number of outputs of the neural network can be based on the number of nodes without the output layer. Embodiments include implementing an activation function in the processing logic associated with the random access memory in which the neural network is stored.

Figure 9:
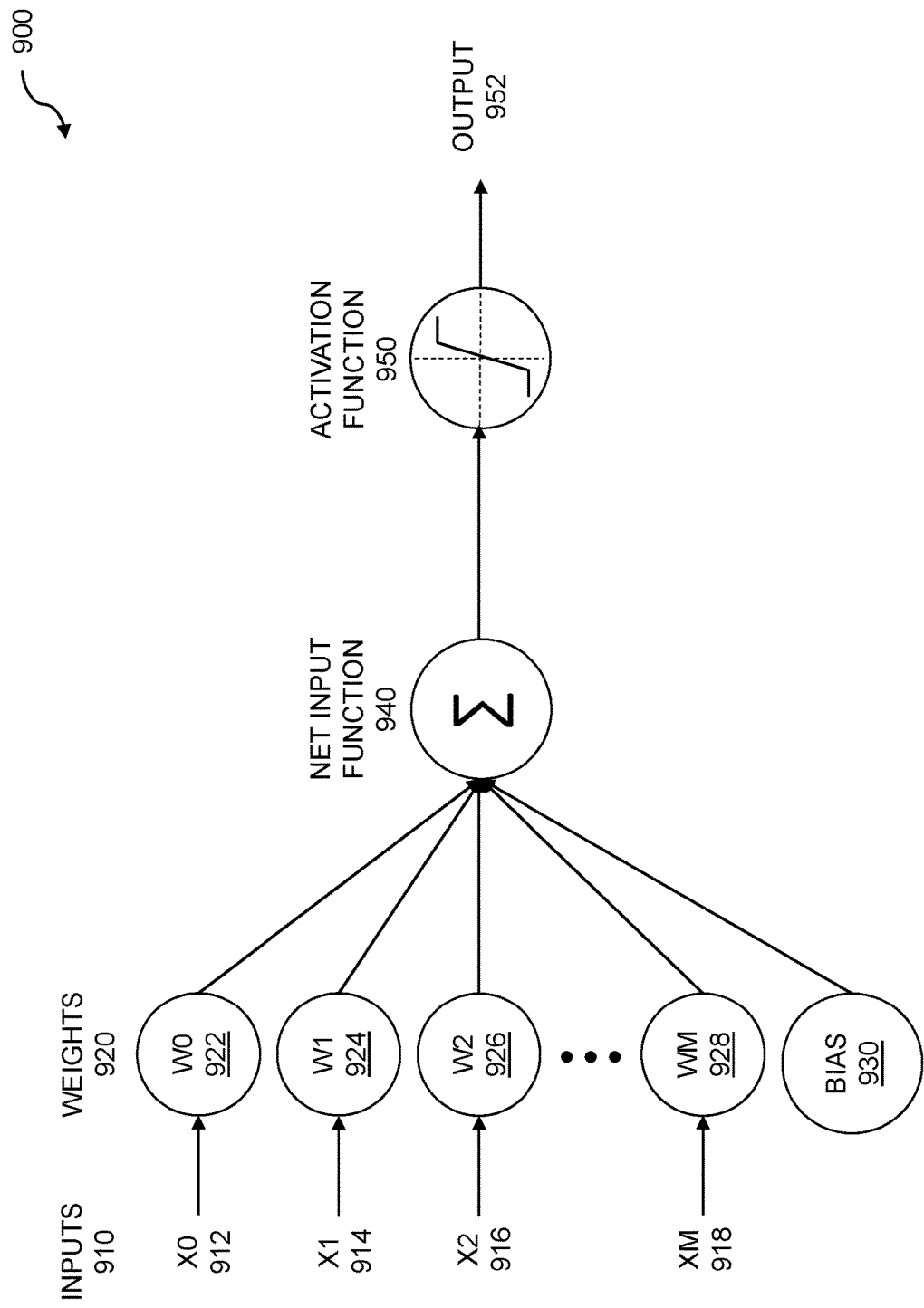
FIG. 9 shows an artificial neural network neuron.

FIG. 9 shows an artificial neural network neuron. The artificial neural network neuron 900 can be trained, and the neuron can represent one neuron of a plurality of neurons associated within a layer included in the neural network. The neural network can include a recursive neural network. An artificial neural network neuron enables a recursive neural network using random access memory. Neural network descriptor information and weight matrices are stored in a semiconductor random access memory device that includes neural network processing logic. The network descriptor information and weight matrices comprise a trained neural network functionality. An input matrix is obtained for processing on the memory device. The trained neural network functionality is executed on the input matrix. Additional data is processed for one or more additional layers until the neural network functionality is complete. The result of the executing is provided at an output of the memory device.

An artificial neural network can include layers, where the layers can comprise an input layer, hidden layers, output layers, and so on. A layer of the neural network is based on neurons or nodes. The neurons of the neural network are trained to form inferences about data based on processing the data. A trained neural network based on neurons can include a set of data inputs 910. The data inputs can include X0 912, X1 914, X2 916, and XM 918. Note that each data input can be mathematically manipulated at each node. The mathematical manipulation can include multiplying an input by a weight. A set of weights is shown 920. The weights, which are determined by training the neural network, can include W0 922, W1 924, W2 926, and WM 928. A bias, such as bias 930, can be associated with a neuron. The products calculated by multiplying input data by weights, as well as the bias, can be provided to a net input function 940. In the example, the net input function can include a full adder, a summer, an accumulator, etc. In embodiments, the net input function can be recursive, where the output of the net input function can be fed back into the input of the net input function. In other embodiments, the operations of multiplying the input by weights, adding the products together, and adding a bias, can be accomplished using a multiply-accumulate unit (MAC). The sum of the added products and the bias can be provided to an activation function 950. The activation function can include a sigmoid function, a rectified linear unit (ReLU), a hyperbolic tangent function (tan h), and so on. An output 952 can be determined for the activation function. In embodiments, the result of the executing is provided at an output of the memory device.

Figure 10:
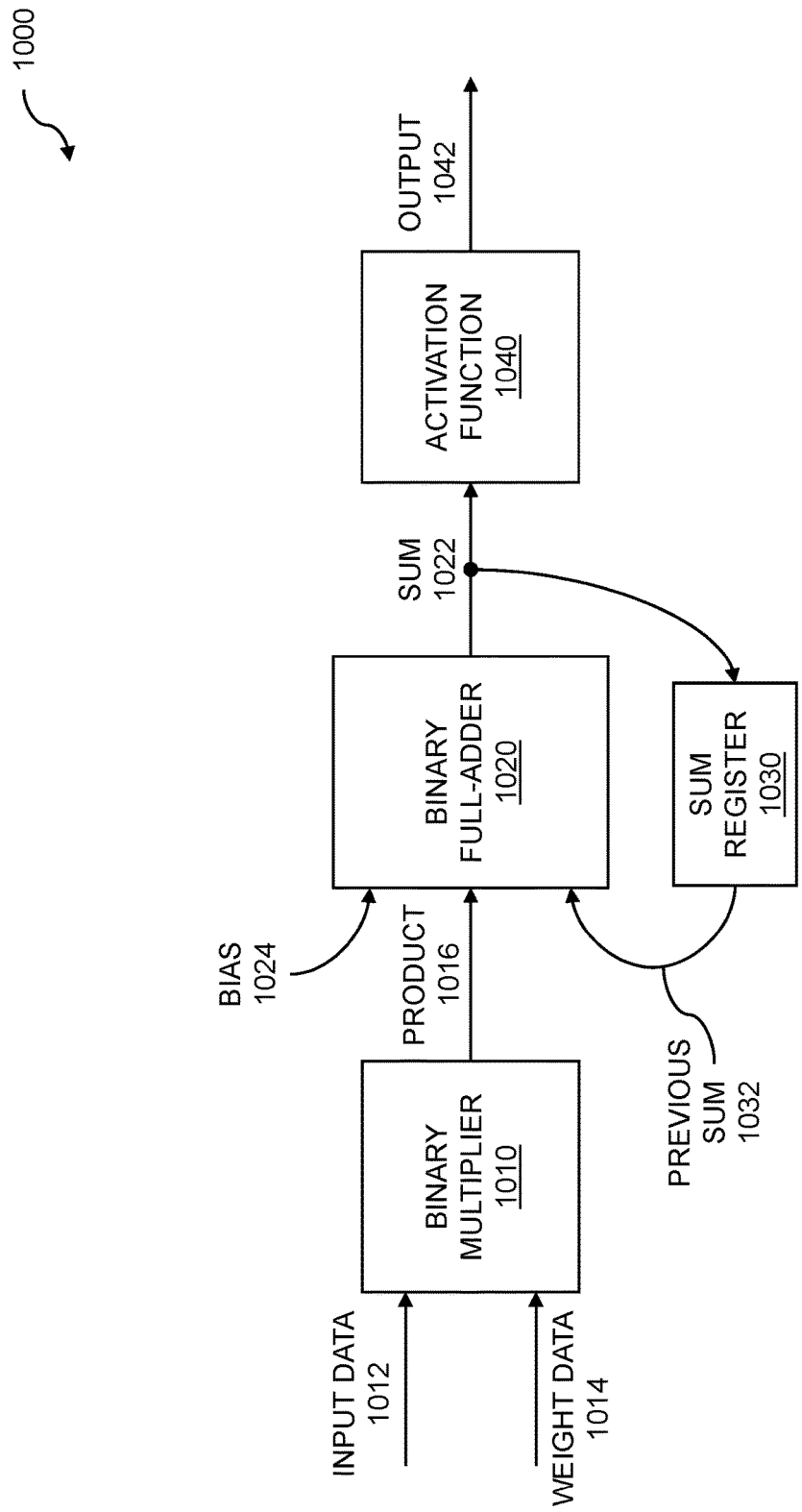
FIG. 10 illustrates an in-memory node.

FIG. 10 illustrates an in-memory node. Neural networks, as described throughout, comprise nodes and arcs. The nodes or neurons perform operations, and the arcs enable communication of data to, from, or between nodes. The neural network of which the node is an element can be configured within a random access memory by storing a neural network descriptor and weight matrices. The configured neural network enables a recursive neural network using random access memory. Neural network descriptor information and weight matrices are stored in a semiconductor random access memory device, where the memory device includes neural network processing logic. The network descriptor information and weight matrices comprise a trained neural network functionality. An input matrix is obtained for processing on the memory device, and the trained neural network functionality is executed on the input matrix. Additional data for one or more additional layers is processed until the neural network functionality is complete. The result of the executing is provided at an output of the memory device.

An in-memory configuration of a node of neural network is shown 1000. The in-memory node includes a binary multiplier 1010. The binary multiplier multiplies or manipulates two binary numbers including input data 1012 and weight data 1014 to produce a binary product 1016. The multiplying of the binary numbers can result from recursive operation of a neural network. The product is provided to a binary adder 1020. The binary adder can include a full-adder as shown, so that the product can be added to further values. Note that the multiplication of input data and a weight is performed one at a time for each input-weight pair. The products of each multiplication are added by the full adder to create a sum, a running sum, a partial sum, etc. Embodiments can include adding biases 1024 to the results of the manipulating or multiplying. The biases can be used to prevent the node from "saturating" at a value such as a maximum value or a minimum value that can be represented by the binary number. The biases can be stored in the random access memory device or other storage device. In embodiments the biases comprise an adjustable bias size. The adjustable bias size can include a number of bits, a number of bytes (e.g. groups of eight bits), etc. The binary adder calculates a sum 1022. The sum can include a running sum, a partial or intermediate sum, and the like. The sum, running sum, etc., can be stored in a sum register 1030. The sum register can include storage allocated within the RAM. The storage allocated within the RAM can be easily and quickly accessed thus reducing write times and read times. The value in the sum register 1030 or a previous sum 1032 can be included as an input to the binary adder. In embodiments, the multiplier and the adder comprise components of a multiply accumulate unit (MAC).

The sum 1022 can be provided to an activation function 1040. An activation function, which can be based on a non-linear property, can enable a neural network to perform non-linear mappings of values between the input values to the neural network and the output 1042 values from the neural network. The activation function enhances the ability of the neural network to converge on a value, where the value can include an inference about the data processed by the neural network. The activation function can be based on a variety of techniques, functions, heuristics, and so on. In embodiments, the activation function can include a sigmoid or rectified linear unit (ReLU). The activation function can also be based on a hyperbolic tangent (tan h) function and other techniques such as leaky ReLU, maxout, etc. Whichever activation function is chosen, the activation function can be defined by the neural network descriptor information. Recall that the neural network description information can be used to configure the neural network. Further embodiments can include implementing an activation function in the processing logic.

Figure 11:
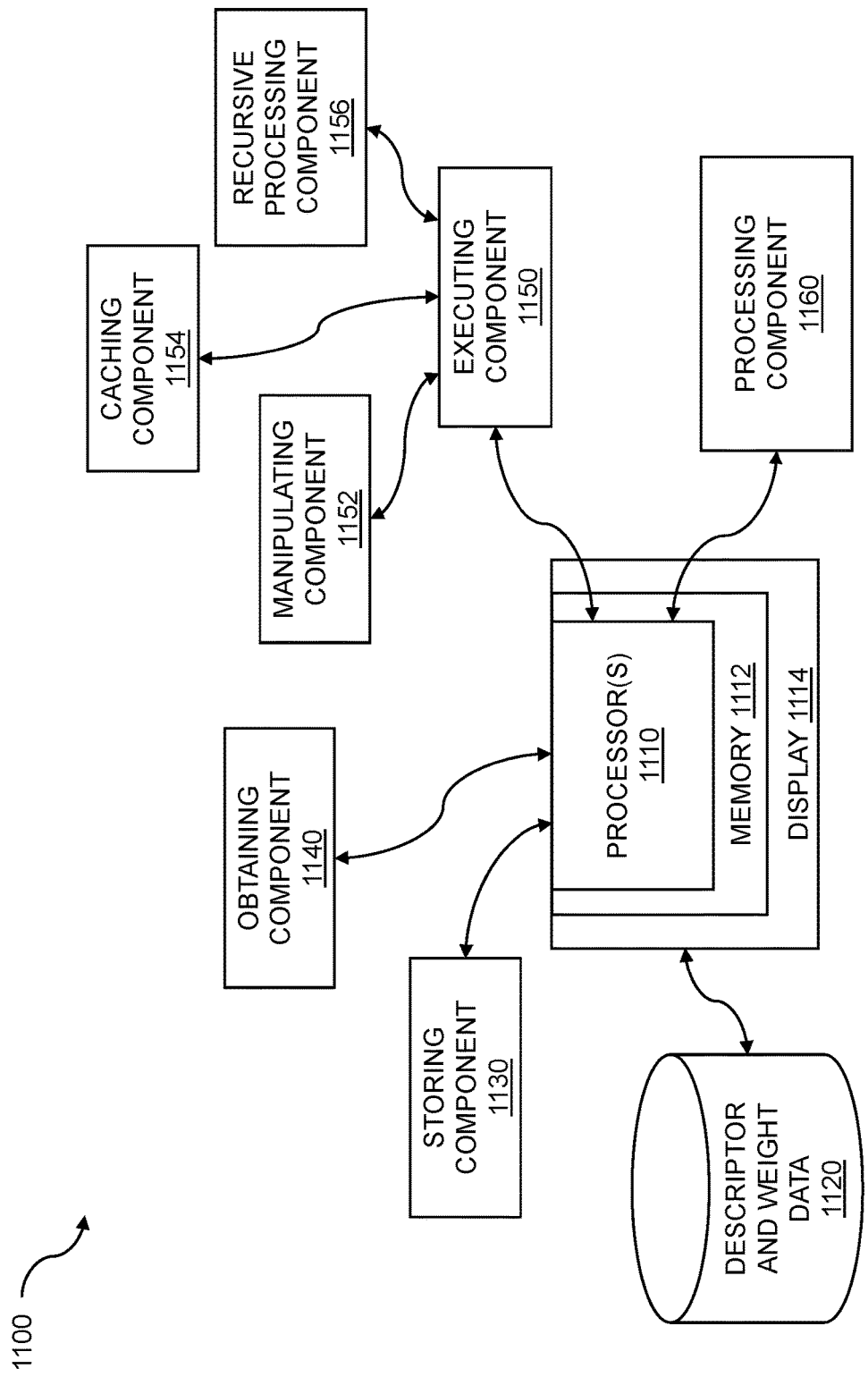
FIG. 11 is a system diagram for neural network manipulation.

FIG. 11 is a system diagram for neural network manipulation. A recursive neural network uses random access memory. The random access memory stores descriptor information and weight matrices which describe a trained neural network. The system 1100 can include one or more processors 1110 attached to a memory 1112 which stores instructions. The system 1100 can include a display 1114 coupled to the one or more processors 1110 for displaying data, intermediate steps, instructions, weights, biases, and so on. In embodiments, one or more processors 1110 are attached to the memory 1112 where the one or more processors, when executing the instructions which are stored, are configured to: store neural network descriptor information and weight matrices in a semiconductor random access memory device, wherein the memory device includes neural network processing logic, and wherein the network descriptor information and weight matrices comprise a trained neural network functionality; obtain an input matrix for processing on the memory device; execute the trained neural network functionality on the input matrix, wherein the executing is configured to: process data for a first layer from the neural network descriptor information to set up the processing logic for a neural network operation; manipulate the input matrix, using the processing logic that was set up and at least one of the weight matrices stored in the memory device; cache results of the manipulating in a storage location of the memory device; process recursively the results that were cached through the processing logic; and process additional data for one or more additional layers until the neural network functionality is complete. The semiconductor random access memory device can include a static RAM (SRAM), a dynamic RAM (DRAM), a phase change memory (PCM), etc.

The system 1100 can include descriptor and weight data 1120. The descriptor and weight data 1120 may be stored using a variety of storage techniques such as electronic storage coupled to the one or more processors, a database, a code library, source code, or other suitable formats. The descriptor information can include neural network descriptor information, and the weight matrices can be associated with nodes within layers of the neural network. The descriptor information can include instructions for operating multiply accumulate units, for performing neural network operations including recursive neural network operation, for manipulating neural network operations, etc. In embodiments, the neural network descriptor information can include neural network architecture headers. The neural network architecture headers can describe the type of neural network such as a convolutional neural network, a feedforward neural network, and so on. In further embodiments, the neural network descriptor information can provide state diagram control for the neural network functionality. The state diagram can describe the flow of data, the calculations performed on the data, and the like. The descriptor data can describe or define operations performed by the neural network. In other embodiments, an activation function can be defined by the neural network descriptor information.

The system 1100 can include a storing component 1130. The storing component 1130 can include a semiconductor random access memory device. Discussed throughout, the RAM device can include a static RAM, a dynamic RAM, a phase-change memory, and so on. For the system 1100, the memory device can include neural network processing logic. The processing logic can be configured to perform arithmetic operations, logical operations, etc. In embodiments, the processing logic can include one or more multiply-accumulate units (MACs). The MACs can be used to perform neural network operations such as multiplying data by weights, adding biases, and so on. Other embodiments include implementing an activation function in the processing logic. The activation function can include a sigmoid function, a rectified linear unit (ReLU) function, etc. The system 1100 can include an obtaining component 1140. The obtaining component 1140 can include functions and instructions for obtaining an input matrix for processing on the memory device. The input matrix for processing can be uploaded by a user, downloaded over a computer network such as the Internet, and so on. The input matrix can be obtained from storage coupled to the one or more processors, from centralized storage, cloud storage, etc. In other embodiments, the matrix can be obtained from the semiconductor RAM device. The matrix can include intermediate results. The obtaining the input matrix from the RAM device can enable recursive neural network processing.

The system 1100 can include an executing component 1150. The executing component 1150 can include functions and instructions for executing the trained neural network functionality on the input matrix. The executing the functionality of the trained neural network on the input matrix can include operations performed by one or more multiply-accumulate units (MACs). The operations that are executing can include multiplying data by one or more weights, adding one or more biases, adding a value to a sum such as a running sum, and the like. The executing can include processing data for a first layer from the neural network descriptor information to set up the processing logic for a neural network operation. The processing the first layer from the neural network descriptor information can be accomplished using a processor component (described below), the executing component, etc. The system 1100 can include a manipulating component 1152. The manipulating component 1152 can include functions and instructions for manipulating the input matrix, using the processing logic that was set up and at least one of the weight matrices stored in the memory device. The manipulating the input matrix and at least one of the weight matrices can be accomplished using one or more MAC units. The system 1100 can include a caching component 1154. The caching component 1154 can include functions and instructions for caching results of the manipulating in a storage location of the memory device. The storage location of the memory device can be used as scratchpad storage, temporary storage, and the like. By caching results of the manipulating, the cached results can be retrieved more quickly than if the results of the manipulating were written back to processor storage, shared storage, cloud storage, and so on. The system 1100 can include a recursive processing component 1156. The recursive processing component 1156 can include functions and instructions for processing recursively the results that were cached through the processing logic. Recursive processing can be used when large amounts of data are to be processed, processing resources are exceeded, etc. The recursion can be used for processing of the neural network. In embodiments, a single layer of the neural network functionality can be accomplished recursively when the functionality requires more MACs than are available.

The system 1100 can include a processing component 1160. The processing component 1160 can include functions and instructions for processing additional data for one or more additional layers until the neural network functionality is complete. The additional layers, which can include hidden layers, can include convolution layers, activation layers, and so on. Discussed throughout, the processing can be accomplished using processing logic, where the processing logic can include one or more multiply-accumulate units (MACs). The processing logic can be implemented within the random access memory, coupled to the RAM, and so on. In embodiments, the MACs can be implemented on pitch on one or more sides of the memory device memory array. On-pitch implementation can simplify connectivity between the RAM and the one or more MACs, can minimize interconnect (e.g. wire) between the RAM and MACs, etc. Recall that biases can be stored in the memory device, where the memory device can include an SRAM, DRAM, phase-change memory (PCM), and the like. In embodiments, the biases can be added in the processing logic. The adding in the biases in the processing logic can be accomplished using one or more MACS. The biases can include an adjustable bias size, where the bias size can be adjusted based on one or more bits.

The system 1100 can include a computer program product embodied in a non-transitory computer readable medium for neural network manipulation, the computer program product comprising code which causes one or more processors to perform operations of: storing neural network descriptor information and weight matrices in a semiconductor random access memory device, wherein the memory device includes neural network processing logic, and wherein the network descriptor information and weight matrices comprise a trained neural network functionality; obtaining an input matrix for processing on the memory device; executing the trained neural network functionality on the input matrix, wherein the executing comprises: processing data for a first layer from the neural network descriptor information to set up the processing logic for a neural network operation; manipulating the input matrix, using the processing logic that was set up and at least one of the weight matrices stored in the memory device; caching results of the manipulating in a storage location of the memory device; and processing recursively the results that were cached through the processing logic; and processing additional data for one or more additional layers until the neural network functionality is complete.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for neural network manipulation comprising:
    storing neural network descriptor information and weight matrices in a semiconductor random access memory device, wherein the memory device includes neural network processing logic, and wherein the network descriptor information and weight matrices comprise a trained neural network functionality, and wherein the neural network descriptor information provides state diagram control for neural network functionality;
    obtaining an input matrix for processing on the memory device;
    executing the trained neural network functionality on the input matrix, wherein the executing comprises:
        processing data for a first layer from the neural network descriptor information to set up the processing logic for a neural network operation;
        manipulating the input matrix, using the processing logic that was set up and at least one of the weight matrices stored in the memory device;
        caching results of the manipulating in a storage location of the memory device; and
        processing recursively the results that were cached through the processing logic; and
    processing additional data for one or more additional layers until the neural network functionality is complete.

2. The method of claim 1 further comprising providing the result of the executing at an output of the memory device.

3. The method of claim 1 wherein the neural network functionality includes a recursive neural network function.

4. The method of claim 1 wherein the processing logic includes one or more multiply-accumulate units (MACs).

5. The method of claim 4 wherein the MACs are implemented on pitch on one or more sides of the memory device memory array.

6. The method of claim 4 wherein a single layer of the neural network functionality is accomplished recursively when the functionality requires more MACs than are available.

7. The method of claim 1 wherein the neural network descriptor information comprises neural network architecture headers.

8. The method of claim 7 wherein two or more bits of the network architecture headers indicate a neural network layer type.

9. The method of claim 8 wherein the layer type includes a fully connected layer, a sparse layer, or a recursive layer.

10. The method of claim 8 wherein the headers comprise a different number of bytes, based on the layer type.

11. The method of claim 1 wherein the state diagram is traversed recursively.

12. The method of claim 1 further comprising adding biases to the results of the manipulating.

13. The method of claim 12 wherein the biases are stored in the memory device.

14. The method of claim 12 wherein the biases comprise an adjustable bias size.

15. The method of claim 1 further comprising implementing an activation function in the processing logic.

16. The method of claim 15 wherein the activation function is defined by the neural network descriptor information.

17. The method of claim 1 wherein the storage location comprises a static random-access memory (SRAM) collocated on the semiconductor random access memory device.

18. The method of claim 1 wherein the storage location comprises a portion of the random access memory of the memory device.

19. The method of claim 1 wherein the memory device comprises a dynamic random-access memory (DRAM).

20. The method of claim 1 wherein the memory device comprises a phase-change random access memory.

21. The method of claim 1 wherein the memory device implements the neural network functionality atomically.

22. The method of claim 21 wherein a single command to the memory device accomplishes the neural network functionality.

23. The method of claim 1 wherein the processing logic switches address multiplexers to a temporary register that points to a layer that will be reused in the processing that is recursive.

24. A computer program product embodied in a non-transitory computer readable medium for neural network manipulation, the computer program product comprising code which causes one or more processors to perform operations of:
storing neural network descriptor information and weight matrices in a semiconductor random access memory device, wherein the memory device includes neural network processing logic, and wherein the network descriptor information and weight matrices comprise a trained neural network functionality, and wherein the neural network descriptor information provides state diagram control for neural network functionality;
obtaining an input matrix for processing on the memory device;
executing the trained neural network functionality on the input matrix, wherein the executing comprises:
processing data for a first layer from the neural network descriptor information to set up the processing logic for a neural network operation;
manipulating the input matrix, using the processing logic that was set up and at least one of the weight matrices stored in the memory device;
caching results of the manipulating in a storage location of the memory device; and
processing recursively the results that were cached through the processing logic; and
processing additional data for one or more additional layers until the neural network functionality is complete.

25. A computer system for neural network manipulation comprising:
a memory which stores instructions;
one or more processors coupled to the memory wherein the one or more processors, when executing the instructions which are stored, are configured to:
store neural network descriptor information and weight matrices in a semiconductor random access memory device, wherein the memory device includes neural network processing logic, and wherein the network descriptor information and weight matrices comprise a trained neural network functionality, and wherein the neural network descriptor information provides state diagram control for neural network functionality;
obtain an input matrix for processing on the memory device;
execute the trained neural network functionality on the input matrix, wherein the executing is configured to:
process data for a first layer from the neural network descriptor information to set up the processing logic for a neural network operation;
manipulate the input matrix, using the processing logic that was set up and at least one of the weight matrices stored in the memory device;
cache results of the manipulating in a storage location of the memory device; and
process recursively the results that were cached through the processing logic; and
process additional data for one or more additional layers until the neural network functionality is complete.

26. A processor-implemented method for neural network manipulation comprising:
storing neural network descriptor information and weight matrices in a semiconductor random access memory device, wherein the memory device includes neural network processing logic, and wherein the network descriptor information and weight matrices comprise a trained neural network functionality;
obtaining an input matrix for processing on the memory device;
executing the trained neural network functionality on the input matrix, wherein the executing comprises:
processing data for a first layer from the neural network descriptor information to set up the processing logic for a neural network operation;
manipulating the input matrix, using the processing logic that was set up and at least one of the weight matrices stored in the memory device;
caching results of the manipulating in a storage location of the memory device; and
processing recursively the results that were cached through the processing logic, wherein the processing logic switches address multiplexers to a temporary register that points to a layer that will be reused in the processing that is recursive; and
processing additional data for one or more additional layers until the neural network functionality is complete.

* * * * *